(12) United States Patent
Kuroiwa et al.

(10) Patent No.: US 6,605,553 B2
(45) Date of Patent: Aug. 12, 2003

(54) TOW MULTIAXIAL NON-WOVEN FABRIC

(75) Inventors: Yuki Kuroiwa, Siki (JP); Kazuhiko Kurihara, Tokyo (JP); Yasuo Sasaki, Niiza (JP)

(73) Assignee: Polymer Processing Research Institute, Ltd. (JP)

(*) Notice: Subject to any disclaimer, the term of this patent is extended or adjusted under 35 U.S.C. 154(b) by 158 days.

(21) Appl. No.: 09/745,439

(22) Filed: Dec. 26, 2000

(65) Prior Publication Data

US 2001/0006866 A1 Jul. 5, 2001

(30) Foreign Application Priority Data

Dec. 28, 1999 (JP) .............................. 11-377350

(51) Int. Cl.$^7$ .............................. D04H 3/00; D04H 3/08; D04H 3/10; D04H 3/14
(52) U.S. Cl. ...................... 442/352; 442/353; 442/381; 442/387; 442/388; 442/402; 442/408; 442/409
(58) Field of Search ............................. 442/387, 388, 442/402, 406, 407, 408, 352, 353, 354, 355, 359, 381

(56) References Cited

U.S. PATENT DOCUMENTS

| | | | | |
|---|---|---|---|---|
| 3,615,989 A | * | 10/1971 | Depoe ........................ | 156/148 |
| 3,761,345 A | * | 9/1973 | Smith ........................ | 112/415 |
| 4,052,242 A | | 10/1977 | Yazawa et al. ............. | 156/265 |
| 5,308,424 A | | 5/1994 | Sasaki et al. ............... | 156/178 |
| 5,338,593 A | | 8/1994 | Sasaki et al. ............... | 428/110 |
| 5,843,557 A | * | 12/1998 | Sternlieb ................... | 428/105 |

FOREIGN PATENT DOCUMENTS

| | | |
|---|---|---|
| JP | 60-199957 | 10/1985 |
| JP | 60-199961 | 10/1985 |
| JP | 62-54904 | 11/1987 |
| JP | 63-117867 | 5/1988 |
| JP | 63-138888 | 6/1988 |
| JP | 1-24903 | 5/1989 |
| JP | 8-209518 | 8/1996 |
| JP | 8-291457 | 11/1996 |
| JP | 11-377350 | 12/1999 |
| WO | 00/21742 | 1/2000 |

OTHER PUBLICATIONS

Sangyo–Sen'i–sizai Handbook, "Handbook of Textile Material for Industrial Use", Published 1994 by Maruzen, p. 375–376.
Patent Abstracts of Japan, Pub. No. 8–291457, May 11, 1996.
Patent Abstracts of Japan, Pub. No. 8–209518, Aug. 13, 1996.

* cited by examiner

*Primary Examiner*—Terrel Morris
*Assistant Examiner*—Jenna-Leigh Befumo
(74) *Attorney, Agent, or Firm*—Lorusso, Loud & Kelly

(57) ABSTRACT

A multiaxial laminated non-woven fabric is formed with tows overlaid and bonded with one another. The starting material tow is crimped and has a total tex of not more than 300,000 and filaments in the tow have an average fineness of not more than 3 tex. A three-dimensional molded product made from the multiaxial non-woven fabric is also provided. The non-woven tow fabric of ensured quality is produced by bonding tows multiaxially and obliquely overlaid with one another, for example by needle punching or heat treatment, while the tows are held by pins of an overlaying machine.

16 Claims, 7 Drawing Sheets

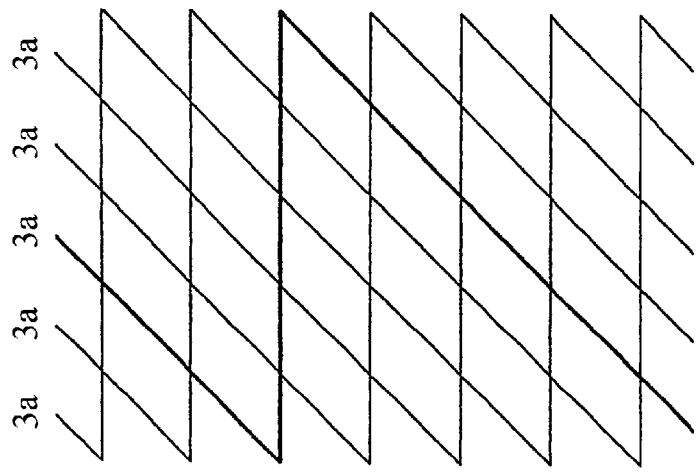
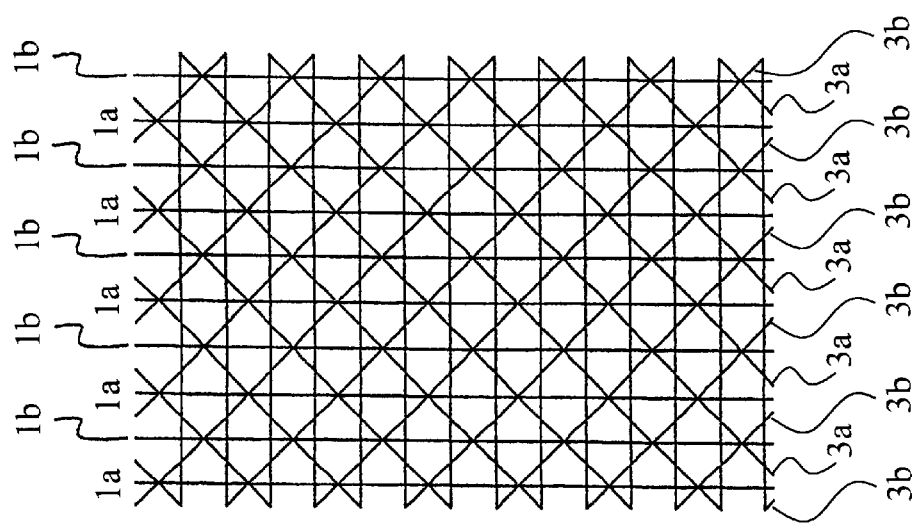

TOW MULTIAXIAL NON-WOVEN FABRIC

BACKGROUND OF THE INVENTION

1. Field of the Invention

The present invention relates to a non-woven fabric made of tows and to a method of producing the same. The non-woven fabric has a high weight, is high in strength in all directions and can be used in manufacturing three-dimensional moulded products or as geotextile, for instance.

2. Description of the Related Art

Geotextiles have been used in the form of woven fabrics in those fields where marked strength is required, for example in reinforcement of an embankment or soft ground.

However, heavy weight woven fabrics can be produced only at a slow rate and require the use of yarns, which increases the cost of production thereof. From the viewpoint of physical properties, they have high strength in the machine and cross-machine directions but are weak in oblique directions at 45°. Therefore, they are not always suited for use as geotextiles, which are required to be strong in every direction. Thus, it becomes necessary to use unreasonably heavy woven fabrics. In this respect also, increases in cost result. To achieve improvement in this respect, tetraaxially woven fabrics have been developed and the use thereof as geotextiles has been studied ("Sangyo-yo Senishizai Handbook (Handbook of Textile Materials for Industrial Use)", published 1994 by Maruzen, page 376). However, tetraaxially woven fabrics are more difficult to produce than woven fabrics produced on ordinary weaving machines, which increases cost. They are thus unsuited for use as geotextiles for which cost is an important factor. Furthermore, woven fabrics, though high in strength, show a low extension ratio, hence their break energy (strength× extension ratio) is low.

When geotextiles are used in other important fields, such as soaking up water, filtration or drainage, for instance, they are required to have water permeability and, accordingly, spunbonded non-woven fabrics and short fiber non-woven fabrics have so far been used. However, spunbonded non-woven fabrics have an average fiber diameter as large as 25 to 30 micrometers, hence their water permeability, which depends on the capillary action of fibers, is not always high. On the other hand, spunbonded non-woven fabrics produced from fibers of a smaller diameter are poor in productivity and cannot avoid increases in cost. Furthermore, the filaments of spunbonded non-woven fabrics are weak in strength, namely their strength is only about 20 mN/tex. Further, the filament alignments in such fabrics are random, hence the capillary action utilization efficiency is low. The short fibers used in non-woven fabrics have a fiber strength as high as 100 to 200 mN/tex but the strength of the non-woven fabrics, which depends on entanglement of the fibers, is very low because the fibers are short. Furthermore, the fiber alignment in the non-woven fabrics is random, and this is not efficient from the viewpoint of water permeability.

In the above discussion, geotextiles have been taken as an example. However, the foregoing comments also apply to the prior art problems in other fields where high tenacity and high break energy are required, for example, roofing base cloths, carpets and flexible containers.

The present inventors have sought to alleviate the weak strength, in oblique directions of 45°, of conventional woven fabrics and cross laminated non-woven fabrics and to develop multiaxially laminated non-woven fabrics, for example triaxially and obliquely laminated or tetraaxially laminated ones (U.S. Pat. No. 5,308,424 and U.S. Pat. No. 5,338,593). Since, however, the fabrics of these laminates are made of yarns, only coarse textures can be realized and the productivity in manufacturing products having a high unit weight is poor. Further, according to these prior patents, the mutual bonding of yarns depends on an adhesive. This means an increased cost of production. Further, the adhesive bonding is generally weak in strength and the adhesive has no heat resistance and, therefore, the utility of the products is limited in many instances.

For producing non-woven fabrics having a great basis weight of 1 $kg/m^2$, for instance, from conventional non-woven fabrics such as spunbonded non-woven fabrics or short fiber-based non-woven fabrics, it is necessary to markedly reduce the production speed. Thus, the advent of a technology for efficiently producing non-woven fabrics having a high unit weight, at low cost has been desired.

In the field of plastics, thermal forming of plastic sheet is employed to produce moulded three-dimensional products. However, woven fabrics have no thermal formability and show a low extension ratio, so that they cannot be used in three-dimensional products.

Some non-woven fabrics have thermal formability (Japanese Laid-open Patent Publication Nos. Sho 60-199957, Sho 60199961, and Hei 8-291457). However, they are formed of low molecular oriented filaments and therefore the finished products made thereof are low in strength and dimensional stability. These are basically spunbonded non-woven fabrics, and hence the productivity in obtaining products with a high unit weight is low.

Therefore, a need exists for materials capable of being made into three-dimensional moulded products, such as car panels, ceilings, office reception room sofas and the like, having high weight and resembling cloths in feel and touch.

Furthermore, the disposal of waste plastics such as PET bottles is not only a problem in the plastics industry but also a social problem, involving the relevant administrative agencies and distribution sectors. The present invention has an important social significance in that such waste plastics are used as raw material resins to thereby open up a road to the mass use of geotextiles and the like while efficiently utilizing waste plastics.

Further, in ordinary tow production, spun and unstretched tows are stored in boxes or cans. A multiplicity of unstretched tows are drawn out from a number of such cans and subjected to stretching and crimping to give product tows or to directly give short fibers upon further processing. In such a process, a large number of cans are required for storing spun and unstretched tows and for supplying them to the step of stretching. Thus, a tow manufacturing plant gives an impression of being full of such cans, and efficiency from the viewpoint of plant space is low. Therefore, a rational method for producing tows, which might appropriately be used in the practice of the invention, is demanded.

Opened tow-based, cross-laminated, non-woven fabrics, produced by opening tows to thin webs, cross laying the webs and bonding them are disclosed in Japanese Laid-open Patent Publication No. Sho 52-124976. However, the efficiency of opening tows is not very good. While the opening of tows may be effective in producing non-woven fabrics low in basis weight, it is not efficient in producing non-woven fabrics with a high basis weight or non-woven fabrics strong in many directions.

SUMMARY OF THE INVENTION

It is an object of the present invention to provide a non-woven fabric having desired characteristics, which cannot have been attained with the conventional woven fabrics or non-woven fabrics, as well as a method of producing the same.

To accomplish the above object, the multiaxially laminated non-woven fabric of the invention has layers each composed of a multiplicity of parallel tows having a total tex of not less than 1,000 but not more than 30,000, and each of said tows is formed of crimped filaments having an average fineness of not more than 3 tex.

The above multiaxially laminated non-woven fabric is a tow-based, laminated, non-woven fabric resulting from bonding by at least one of the following techniques or methods (1) to (5): (1) Needle punching, (2) stitch bonding, (3) ultrasonic bonding, (4) water jet, (5) through air.

The above multiaxially laminated, non-woven fabric shows a tensile strength at 50% elongation not less than 10 mN/tex in each of warp direction, weft direction and oblique direction at 45°.

The tows constituting the above multiaxially laminated, non-woven fabric comprise tows composed of conjugate fibers or bicomponent fibers made of at least two polymers differing in softening point, and are bonded together by thermal embossing or thermal press treatment to give a tow-based, laminated, non-woven fabric.

Another object of the present invention is to provide three-dimensional moulded products made of the above tow-based, laminated, non-woven fabric.

A further object of this present invention is to provide a method of producing tow-based multiaxial non-woven fabrics in which multiaxial lamination of tows is followed by interfilament bonding or web heat treatment in a state in which oblique members multiaxially overlaid and obliquely crossing one another are held, at opposing side edges thereof, by pins.

A still further object of this present invention is to provide a method of producing three-dimensional moulded products made of a tow-based laminated non-woven fabric which comprises shaping or moulding the above multiaxially laminated, non-woven fabric comprising conjugate fibers or bicomponent fibers, made of at least two polymers differing in softening point, into three-dimensional moulded products and then subjecting the three-dimensional moulded products to heat treatment at a temperature not lower than the softening point of the polymer which has the lower softening point.

The above and other objects, features and advantages of the present invention will become apparent from the following description with reference to the accompanying drawings, which illustrate embodiments of the present invention.

BRIEF DESCRIPTION OF THE DRAWINGS

FIG. 2A is a schematic representation of a tow-based tetraaxially laminated non-woven fabric according to another embodiment of the invention.

FIG. 2B is a view showing a lay pattern of a group of 20 tows constituting the tetraaxial non-woven fabric.

DESCRIPTION OF THE PREFERRED EMBODIMENTS

Figure 1:
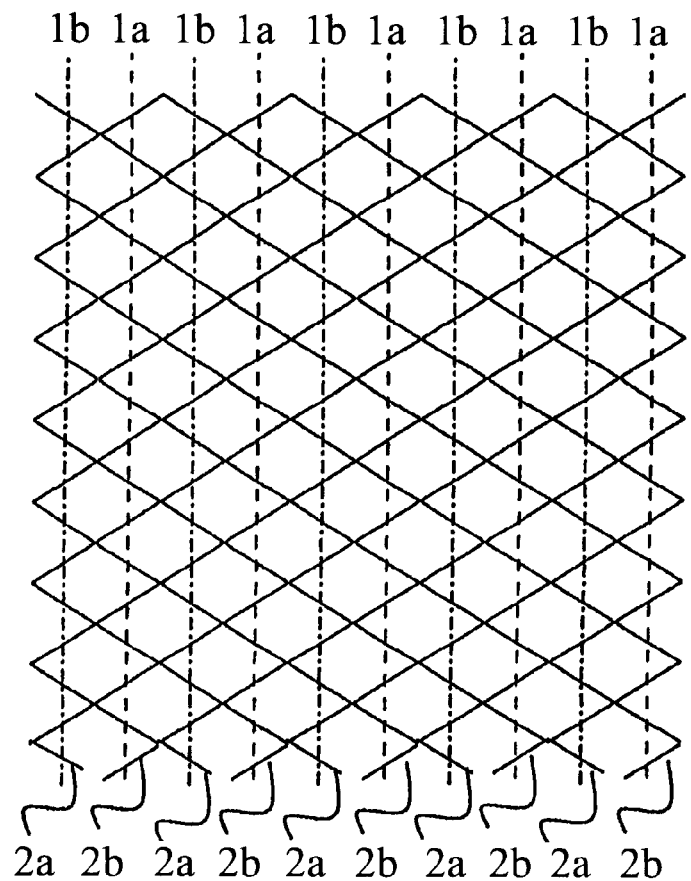
FIG. 1 is a schematic representation of a tow-based triaxially laminated non-woven fabric according to an embodiment of the invention.

In accordance with the present invention, multiaxially laminated non-woven fabrics, namely, obliquely laminated triaxial, tetraaxial, pentaaxial and further multiaxial non-woven fabrics are provided. These non-woven fabrics, unlike woven fabrics or cross-laminated non-woven fabrics, are characterized by the presence of obliquely crossing members. non-woven fabric resulting from lamination and bonding of warp (especially tows) and oblique members (especially tows) crossing the warp members in two directions and crossing each other with the warp members as approximate axes of symmetry. It may also be a non-woven fabric resulting from lamination and bonding of weft members (especially tows) and oblique members (especially tows) crossing the weft members in two directions and crossing each other with the weft members as approximate axes of symmetry.

The "tetraaxial non-woven fabric" or "tetraaxially laminated non-woven fabric" means a non-woven fabric resulting from lamination and bonding of warp, weft and oblique members crossing the warp and weft in two directions and crossing each other with the warp or weft as approximate axes of symmetry.

The "pentaaxial non-woven fabric" or "pentaaxially laminated non-woven fabric" is a combination of warp members and two sets of oblique members which differ in angle of crossing with the warp in two directions and crossing each other with the warp members as approximate axes of symmetry.

In these multiaxial non-woven fabrics, it is assumed that the warp form one layer. It is also possible to dispose the warp on both the front and reverse sides.

The structure of the multiaxially laminated non-woven fabric may be any of those of U.S. Pat. No. 5,308,424 or U.S. Pat. No. 5,338,593 or any other non-woven fabric resulting from lamination and bonding of warp, weft and oblique members, without any particular restriction.

In accordance with the invention, tows are used as at least part of the warp, weft and oblique members.

A "tow" is defined, according to JIS (Glossary of textile terms in Japanese Industrial Standards), as a "type of raw spinning material and a bundle of a very large number of filaments" and, in describing the invention, the term "tow" is used in this sense and thus means "a bundle of a very large number of filaments".

The term "filament" means an essentially continuous fine fiber and is distinct from a short fiber not more than about 80 millimeters in length.

The reason why tows are used is as explained below. With multiaxial laminates produced using conventional yarns, products having a high basis weight can be obtained only with poor productivity. By using tows in accordance with the invention non-woven fabrics having a high basis weight can be realized, and provide a non-woven fabric found best suited for use as geotextile. The present invention provides a non-woven fabric, which has a high basis weight of not more than 500 g/m$^2$, preferably not more than 800 g/m$^2$, most preferably 1 kg/m$^2$. "Basis weight" means mass (g) of fabric per square meter.

In the prior art, there was no technology available for making tows directly into sheets and it was impossible to produce, from tows, heavy non-woven fabrics having a uniform basis weight distribution and showing a sufficient level of strength in every direction. Therefore, non-woven fabrics have so far been produced by using short fibers. However, the production of short fiber non-woven fabrics requires extra steps such as cutting tows and carding them and, as a result of cutting tows, the strength of the fibers can never be fully utilized and the product strength disadvantageously depends on the bonding strength. On the contrary, the present invention has overcome these problems by directly using tows and has made it possible to realize heavy non-woven fabrics strong in multiple directions.

When tows are used as ordinary raw spinning materials, they have total tex of 50,000 to several hundred thousand. However, the tows to be used as oblique members in the practice of the present invention desirably have a total tex of 1,000 to 30,000, in particular 2,000 to 25,000. Tows having an excessively high total tex are difficult to handle, while the use of tows with a total tex less than several hundred is of no significance, since yarns for industrial use are in general use. In addition, tows small in total tex increase the cost of the production of non-woven fabrics.

The tows to be used as warp members may have a total tex as high as 30,000 to 50,000. In some cases, when used in an opened form, the tows may have a fineness (in tex) of 100,000 or more.

The filaments constituting the tows to be used in accordance with this invention have an average fineness of not more than 3 tex, desirably not more than 1 tex. Experiments revealed that when the single filament fineness is in excess of 3 tex and needle punching is used to effect the bonding, for instance, without using any adhesive, webs did not become entangled to a satisfactory extent, failing to afford sufficient bonding strength.

The method of producing tows for use in the practice of the invention is not limited to the method of producing the so-called short fibers. For example, the tows can also be prepared by stretching filaments spun from a spunbond-die, meltblow-die, flashspun-die, centrifugal spin die or the like used for producing non-woven fabrics. The only essential requirement is that each tow is a "bundle of a very large number of filaments".

In the multiaxial non-woven fabric according to this invention, conjugate fibers made of at least two polymers differing in softening point or melting point or fibers differing in softening point or melting point may be used in admixture. Such differing fibers may be contained in the tows, or another web containing these fibers may be laminated with a multiaxial non-woven fabric, followed by bonding by needle punching, for example.

The term "fibers" means fibers in a broader sense of the word, including not only short fibers but also filaments.

The softening point is the temperature at which the fibers in question become soft and, at above that temperature, they begin to adhere together.

The use of conjugate fibers is effective in providing bulkiness and/or favorable touch and, further, the lower melting component acts as an adhesive component and hence can be used in bonding tow filaments or layers together by thermal embossing or thermal press treatment.

The mixing of fibers differing in shrinkage percentage is effective in enhancing bulkiness or touch owing to the difference in softening point or melting point and, further, the lower softening point component fibers serve as an adhesive component and therefore can be utilized in interfilament or interlayer bonding by thermal embossing or thermal press treatment.

Generally, tows are subjected to crimping so that the filaments are not loosened by static electricity and remain entangled. In the practice of the invention, crimping is effective not only in entanglement but also in rendering the needle punching or water jet, for example, more efficient in the mutual bonding of filaments or laminate layers. Crimping is generally carried out using a stuffing box. The techniques of conjugate crimping, edge crimping, gear crimping, three-dimensional crimping and the like are also effective.

The tows to be used in the practice of this invention are relatively low in total fineness (in tex). The productivity in manufacturing tows small in total tex is generally low in the ordinary spinning processes used for producing short fibers. However, production of tow by spinning, stretching and crimping, carried out continuously, results in tows of relatively small total fineness and suited for use in tow-based laminated non-woven fabrics. In this manner, tow can be produced with rather good productivity and with good efficiency from the viewpoint of plant space, since space is no longer required for a large number of boxes or cans for storing unstretched spun tows and or for disposing a large number of empty boxes or cans. In this process, a group of filaments running a spinning speed of several thousand meters per minute are stretched at that speed and further crimped at that speed, utilizing a high-speed stretching apparatus and a high-speed crimper. When the stuffing box method is employed as the means of crimping, it is necessary for the stuffing box to endure that speed of several thousand meters per minutes. The apparatus utilized for this purpose may be that disclosed in Japanese Laid Open Patent Publication No. Sho 59-59931.

The step of stretching may also be carried out in the step of spinning for producing filaments from a molten polymer, by increasing the draft ratio.

In the practice of the invention, it is not always necessary that all filaments or fibers incorporated into the product of the present invention be tows. When tows are used as at least part of the filaments, the intended purpose can be satisfactorily achieved in some applications. For example, it is also possible to use tows as warp members alone and to use ordinary yarns as oblique members.

It is further possible to unite a tow-based multiaxial laminate according to the invention with another web, for example a spunbonded non-woven fabric, by bonding by means of needle punching, for instance. In such a fabric, it is also judicious to incorporate the other web between the warp member layer and oblique member layer. As the other web, a spunbonded non-woven fabric or the like may be incorporated as an extender for reducing the cost or increasing the thickness, a melt-blown non-woven fabric, formed of ultrafine filaments and therefore serving as a filter, may be incorporated for utilizing its filter effect, a polyvinyl alcohol or cotton non-woven fabric may be incorporated for obtaining hydrophilicity, a web having an antimicrobial or miticidal action may be used, or a woven fabric may be incorporated for dimensional stability, for instance.

Most suited as the means of interfilament or interlayer bonding in the practice of the present invention is needle punching. Even for such heavy non-woven fabrics as provided by the invention, needle punching can realize bonding with good efficiency. As compared with the use of an adhesive, needle punching has advantages: the cost is low, the non-woven fabrics will never be rendered rigid and the water permeability required of geotextiles is never impaired.

Needle punching is an effective method of bonding also for producing non-woven fabrics having a high extension ratio, which is one of the characteristic features of the invention.

Furthermore, products bonded by needle punching are characterized by their soft feel and suave appearance, which are important factors in using the products of this invention in car seats or ceilings, office chairs and the like. These features are effectively obtained by use of needles capable of attaining not only mere needle locking but also decorativeness, good feel and touch.

The bonding techniques employed in the practice of the present invention include, not only needle punching, but also stitch bonding, ultrasonic bonding, the water jet process, the through air method and the like. These means, too, can effect bonding without using any adhesive, and hence are suited for treating heavy webs. The water jet process is a non-woven production process which bonds by use of water jets at high pressure. The through air method for non-woven production achieves bonding by passing hot air through the fabric to cause adhesion of bicomponent fibers.

Those multiaxial non-woven fabrics which contain conjugate fibers or mixed fibers of polymers differing in melting point may also be bonded by such bonding means as embossing, thermal pressing or through air. In this case, it is also possible to employ the above-mentioned embossing or like means while using an adhesive web as the other web referred to hereinabove.

The bonding is desirably performed with the oblique members of the multiaxial laminate, which obliquely cross with one another, held at both side edges by pins after the step of multiaxial lamination of tows. By carrying out the bonding with the oblique members held by pins, it becomes possible to effect the bonding without disturbing the multiaxial arrangement of tows and without disturbing the intended strength balance. Furthermore, the product width becomes constant, there is only slight fluctuation in the basis weight and, accordingly, no portion becomes low in strength.

After the above steps of multiaxial lamination and bonding, the multiaxial laminate is desirably heat-treated with the oblique members thereof, which obliquely cross with one another, held at both side edges by pins. Removing those strains caused by needle punching by such heat treatment can contribute to product stabilization. When a product has internal strains, the product may become twisted or distorted. By carrying out heat treatment with the oblique members held by pins, it becomes possible to provide a non-woven fabric of improved uniformity in width, flatness and/or dimensional stability.

In the prior art, in needle punching, for instance, of short fiber non-woven fabrics, a woven fabric called carpet backing is often used as a backing material for attaining the above-mentioned dimensional stability and width uniformity and for reinforcement. On the contrary, the present invention is also characterized in that sufficient levels of strength, dimensional stability and width uniformity, among others, can be attained without using such a backing material.

The non-woven fabric of the present invention is particularly suited for use as a geotextile. Geotextiles are required to have high absolute strength and break energy values and further required to be strong in every direction. Since they are buried in the ground, they are required to be as inexpensive as possible. Therefore, it is necessary to use a minimum amount of fibers as efficiently as possible. The nature of the earth, which is the target of use of geotextiles, varies with differences in geographical features, and may contain obstacles such as stones and rocks, and/or consist of mixed firm and soft grounds, for instance, and, therefore, it is not sufficient for geotextiles to have strength alone, they must have a sufficient extension ratio also. The direction in which strength or tenacity is required cannot be anticipated and, therefore, geotextiles are generally required to have sufficient levels of strength and break energy in every direction. According to the present invention, tows consisting of continuous fibers or filaments are directly used, so that the non-woven fabric of the invention has strength and crimps and shows a high elongation before break, and hence shows high break energy. The non-woven fabric of the invention is multiaxial, and hence is strong in every direction and well suited for use as a geotextile.

Further, the multiaxial non-woven fabric of the invention has very slight basis weight irregularity, i.e., it is free of portions low in strength and other irregularities, so that the objects of the invention can be accomplished using a minimum calculated amount of fibers, which leads to cost reduction.

The multiaxial non-woven fabric of the invention can be used as a geotextile for the purpose of reinforcement, drainage or filtration, for example. Thus, for example, it can be used in or for soft ground improvement, packed sand drainage, sandwich method, soft subgrade soil bearing capacity improvement, slope reinforcement, railway embankments, railway cobble stone stabilization, road pavement reinforcement, subgrade-base separation, and the like.

Since fine filaments extend continuously in each tow in the non-woven fabric of the invention, it shows effective capillary action and is effective in removing water in drainage, separation, filtration and so forth.

The multiaxial non-woven fabric of the invention has the above-mentioned advantages from the viewpoint of performance and production and therefore can be used not only as geotextile but also as roofing base cloth, carpet, car interior, flexible container base cloth, civil engineering base cloth, waterproof sheet, or machinery or furniture protecting cover.

In the case of use as roofing base cloth, the non-woven fabric of the present invention has a great absolute value of strength x extension ratio and is particularly effective in such use (JIS A 6022, JIS A 6013).

Flexible containers are required to be larger and safer by recent demands for distribution rationalization. The high break energy realized by the invention greatly contributes to that end.

Carpets are required to have high functionality. The 25 soft and high-strength non-woven fabric of this invention can be a quality carpet product.

Further, combinations of the multiaxial non-woven fabric of the invention with another material or other materials can give bases for various other goods.

Another characteristic feature of the multiaxial non-woven fabric of the invention is that the elongation at break is increased. This is due to the fact that tows have crimps. The extent to which crimps of the tows are retained in the multiaxial non-woven fabric depends on the tension applied to the tows in lamination, and/or needle punching and/or heat treatment. A high elongation at break means that the break energy (strength at break×elongation at break) is high, and this is important not only in the use as geotextile or roofing base cloth, as mentioned above, but also in other applications, for example, the production of three-dimensional moulded products by deep drawing.

Further, the crimps provide not only mechanical features but also soft feel and touch.

The three-dimensional moulding in the practice of this invention converts the non-woven fabric of the invention into a three-dimensional structure by mechanical shaping, typically by deep drawing.

The three-dimensional structure of the invention is characterized in that the moulded product is mechanically tough and, at the same time, retains the soft feel of the non-woven fabric. Another feature is that a heavy moulded product is formed. In moulding thick plastic sheets, the thick sheets must be heated uniformly and this involves losses of energy and technological difficulties in uniform heating. On the contrary, in moulding the multiaxial non-woven fabric of this invention, heating is not always involved and, therefore, in many instances, no heat energy is lost and no technical difficulties in uniform heating are encountered in spite of the moulding of heavy products.

The tows used in the practice of the present invention are made of organic synthetic fibers consisting of polypropylene, polyester, polyamide, polyacrylonitrile, polyvinyl alcohol or the like. Tows made of high performance or high function fibers, such as ultrahigh strength polyethylene, aramid or polyarylate fibers, may also be used.

It is a characteristic feature of the present invention that tows spun from, as the main resin material, recovered waste plastics can be used. In use as geotextile or the like, the fabric of the present invention is free of problems such as unevenness in fineness of constituent filaments and dyeability, the filament diameter is not required to be fine, and no feel or like features are required. Accordingly, waste plastics comprising various materials can be used as a raw material, provided the material does not cause frequent filament breakage in the process of spinning. The use of waste plastics reduces cost and thus renders the non-woven fabric best suited, for example, as a geotextile for which cost is an important factor, and serves as an effective utilization of waste plastics.

As described hereinabove, the present invention has made it possible to produce, efficiently and at low cost, multiaxial non-woven fabrics having high mutli-directional strength and a high extension ratio, hence showing a high level of break energy in every direction, and having a high basis weight.

The multiaxial laminated non-woven fabric of the present invention has a markedly increased level of break energy as compared with short fiber non-woven fabrics or spunbonded non-woven fabrics which have so far been used as heavy or thick non-woven fabrics.

The non-woven fabric of this invention is much less expensive than tetraaxial woven fabrics, which have multi-directional strength and increased thickness.

Since the individual filaments of the tow-based multiaxial non-woven fabric of the present invention are crimped, the non-woven fabric has a high extension ratio, a soft touch and can be readily changed in shape. Making good use of this high extension ratio characteristic, it is now possible to realize three-dimensional moulding, such as deep drawing, and thus conduct one-piece moulding of car seats or ceilings, office chair coverings and the like.

The tow-based multiaxial non-woven fabric of the invention, when coated or impregneated with a resin or laminated with a certain sheet, can also be used as a waterproof sheet or civil engineering sheet.

Now, referring to the drawings, several embodiment of this invention will be described.

FIG. 1, FIG. 2 and FIG. 3 each schematically illustrate the manner of lamination of the tow-based multiaxially laminated non-woven fabric of the invention.

FIG. 1 shows an example of triaxial lamination. The multiplicity of tows $1a$ shown by dotted lines in the longitudinal direction are warp tows on the reverse side of a triaxial non-woven fabric, which is an example of the multiaxial non-woven fabric of the invention. The multiplicity of tows $1b$ shown by dash-and-dot lines are warp tows on the front side of the non-woven fabric. Tows $2a$ constitute one of two groups of oblique tows, which cross obliquely with each other. Tows $2b$ constitute the other group of oblique tows crossing with the group of tows $2a$. It is not always necessary that these members' $1a$, $1b$, $2a$ and $2b$ all be tows. It is sufficient if tows account for at least part thereof.

In the drawing figures, lines are used to show tows, for easier understanding. However, the tow is not a yarn and has bulk. Thus, although the tow-based laminated non-woven fabric is shown as a net-like structure composed of crossing lines in the drawing figures, the whole of the non-woven fabric is filled with filaments.

FIG. 2A shows an embodiment with tetraaxial lamination and FIG. 2B shows the pattern of running of one group of tows $3a$. In FIG. 2B, one tow is shown as a thick line for easier understanding of the traveling pattern thereof.

The tetraaxial laminate further comprises a group of tows $3b$ symmetrically crossing the group of tows $3a$ as well as the warp member tows $1a$ and $1b$ shown in FIG. 1.

Figure 3B:
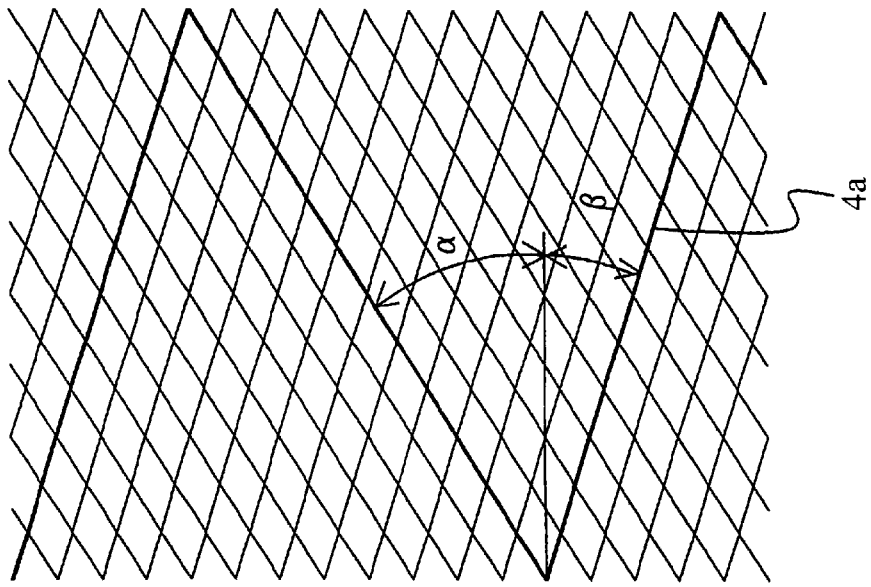
FIG. 3B is a view showing a lay pattern of a group 4a of tows constituting the pentaaxial non-woven fabric.
Figure 3A:
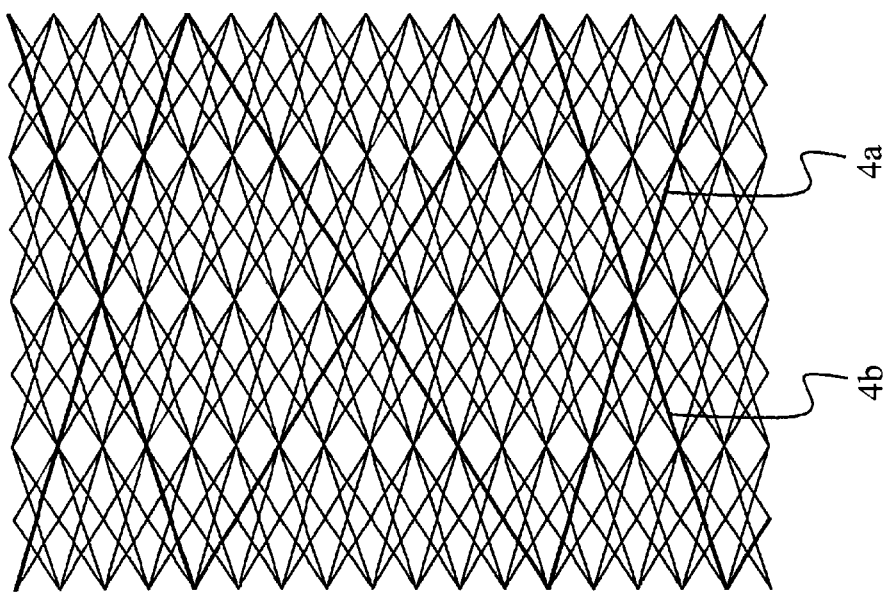
FIG. 3A is a schematic representation of a tow-based pentaaxially laminated non-woven fabric according to another embodiment of the invention, with the materials laid in the machine direction being omitted.

FIG. 3 shows an example of pentaaxial lamination. In FIG. 3A, the longitudinal warp members, one of the five axially parallel groups, are omitted. FIG. 3B shows the pattern of traveling of one tow of one group $4a$, wherein the angles, $\alpha$ and $\beta$, of the turn around each pin are different. The pentaaxial laminate is comprised of this group $4a$, a group $4b$ of tows obliquely and symmetrically crossing the group $4a$, as well as the warp member tows $1a$ and $1b$ shown in FIG. 1. All of these materials need not be tows. Providing tow-feeding guides in multiple stages can also produce hexaaxial and further multiaxial laminates.

Figure 4:
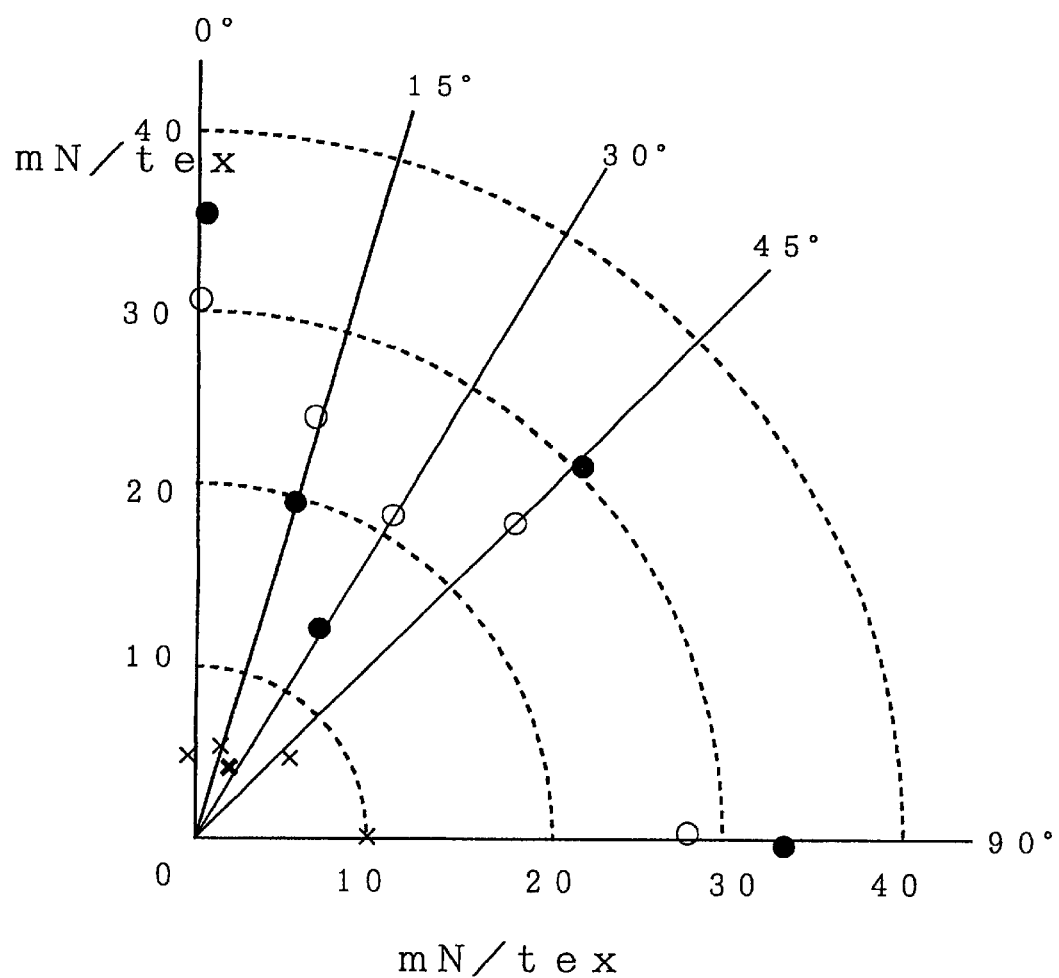
FIG. 4 is a graphic representation of the strength distribution at 50% elongation in a tow-based multiaxial non-woven fabric according to an embodiment of this invention, in comparison with a short fiber non-woven fabric.

FIG. 4 graphs the strength of examples of the multiaxial non-woven fabrics of this invention, wherein the experimental results of strength distribution at 50% elongation testing in a plane are shown in comparison with the results obtained with a short fiber non-woven fabric.

Figure 5:
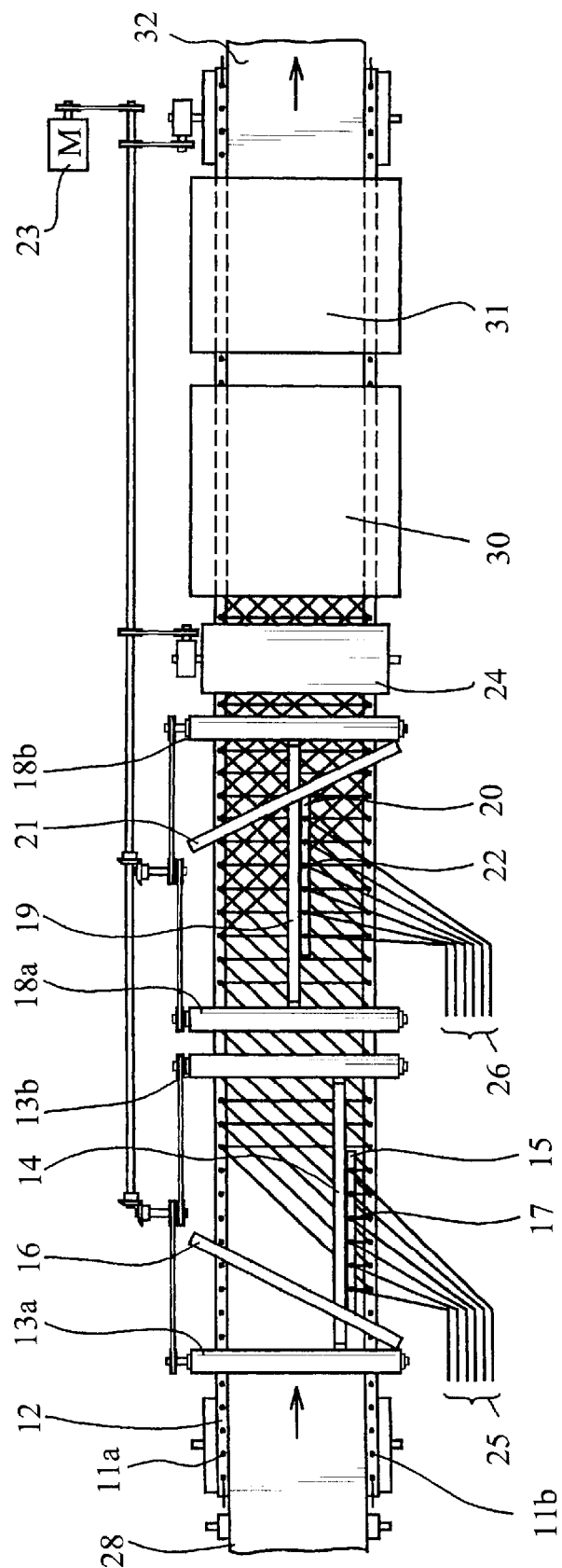
FIG. 5 is a plan view illustrating apparatus and the process for producing two-based multiaxial non-woven fabrics according to an embodiment of the invention.
Figure 6:
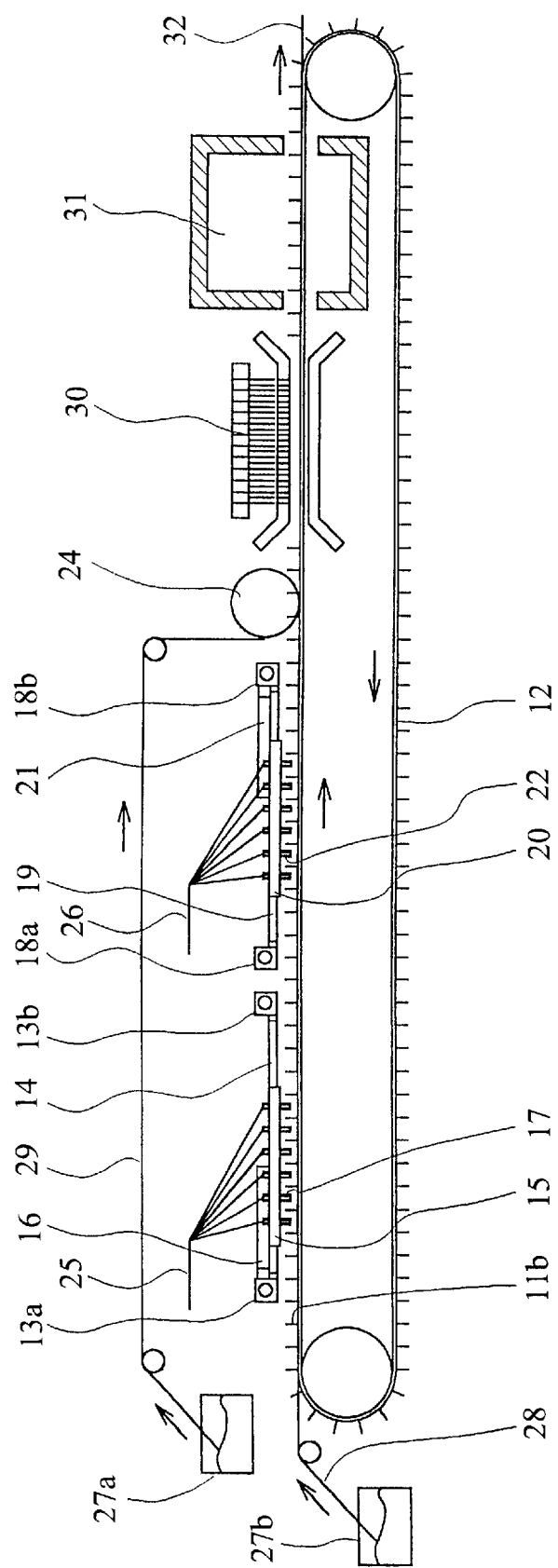
FIG. 6 is a side view illustrating apparatus and the process for producing tow-based multiaxial non-woven fabrics according to an embodiment of the invention.

FIG. 5 and FIG. 6 illustrate an example of the equipment for laminating tows according to the invention. FIG. 5 is a plan view and FIG. 6 is a side view.

Referring to FIG. 5 and FIG. 6, a conveyer 12 has, along the left and right edges, relative to the traveling direction, pin arrays $11a$ and $11b$ for guiding tows at a predetermined pitch. On the upper side of the conveyer 12 are disposed a pair of cylindrical cams $13a$ and $13b$ parallel to each other and crossing the conveyer at right angles. As the cams rotate, a tow feeding guide 15 connected to the rail 14 between the cams 13a and 13b by means of bearings (not shown) goes back and forth between the cams in the direction crossing the pins 11a and 11b on the conveyer 12. Another rail 16 is held on the tow feeding guide 15 by means of bearings (not shown) above the conveyer at a height differing from that of the rail 14 (guide rail), at a certain predetermined angle. The angle of crossing of tows in the products can be altered according to the angle of rail 16. When the angle is 63.5 degrees relative to the longitudinal direction of the conveyer 12, the tetraaxial lamination shown in FIG. 2 can be realized. When that angle is 90 degrees, namely when the rail is parallel to the cylindrical cams, the triaxial lamination shown in FIG. 1 can be realized. For the tetraaxial lamination shown in FIG. 2, one more pair of tow feeding guides 20 connected to the rail 19 are required and, in this case, a rail 21 is disposed at an angle of −63.5 degrees, which is symmetrical to the angle of the rail 16. These two feeding guides 15 and 20 have a number of thin guide tubes 17 and 22, respectively. The rotation of the cylindrical cams 13 and 18 and of a nip roll 24 is controlled in synchronization with the conveyer 12 driven by a motor 23.

A multiplicity of tows stored in a number of boxes 15 (cans) are adjusted with respect to tension and fed, as tows 25, 26, to the multiaxial overlaying machine. The tows are distributed into the tow feeding tubelets 17 and 22, respectively. The respective tows fed to the two feeding tubelets 17 and 22 on the tow feeding guides 15 and 20, shuttling to and fro crossing above the conveyer, are held by the right and left pins 11a and 11b on the conveyer and the tows are overlaid on the conveyer.

A large number of tows 28 and 29 are fed from cans 27a and 27b as warp members. Tows 28 of one group are placed side by side on the conveyer, while tows 29 of the other group are fed onto the group of cross-overlaid tows. The group of cross-overlaid tows is sandwiched between the groups of tows 28 and 29 by means of the nip roll 24. The groups of tows thus overlaid are subjected to needling on a needle-punching machine 30 while the group of cross-overlaid tows is held by the arrays of pins 11a and 11b. The subsequent heat treatment with a hot air heat treatment apparatus 31 gives a tow-based multiaxially laminated non-woven fabric 32.

Another non-woven fabric, such as a short fiber non-woven fabric or spunbonded non-woven fabric, may be laid between those two groups or on the surface thereof and integrated with the tow-based multiaxial laminate by needle punching. When the other non-woven fabric contains fibers lower in softening point in the form of conjugate fibers or mixed fibers, then the three-dimensional product obtained by moulding can maintain its three-dimensional shape as a result of fusion of the low-softening component.

Figure 7:
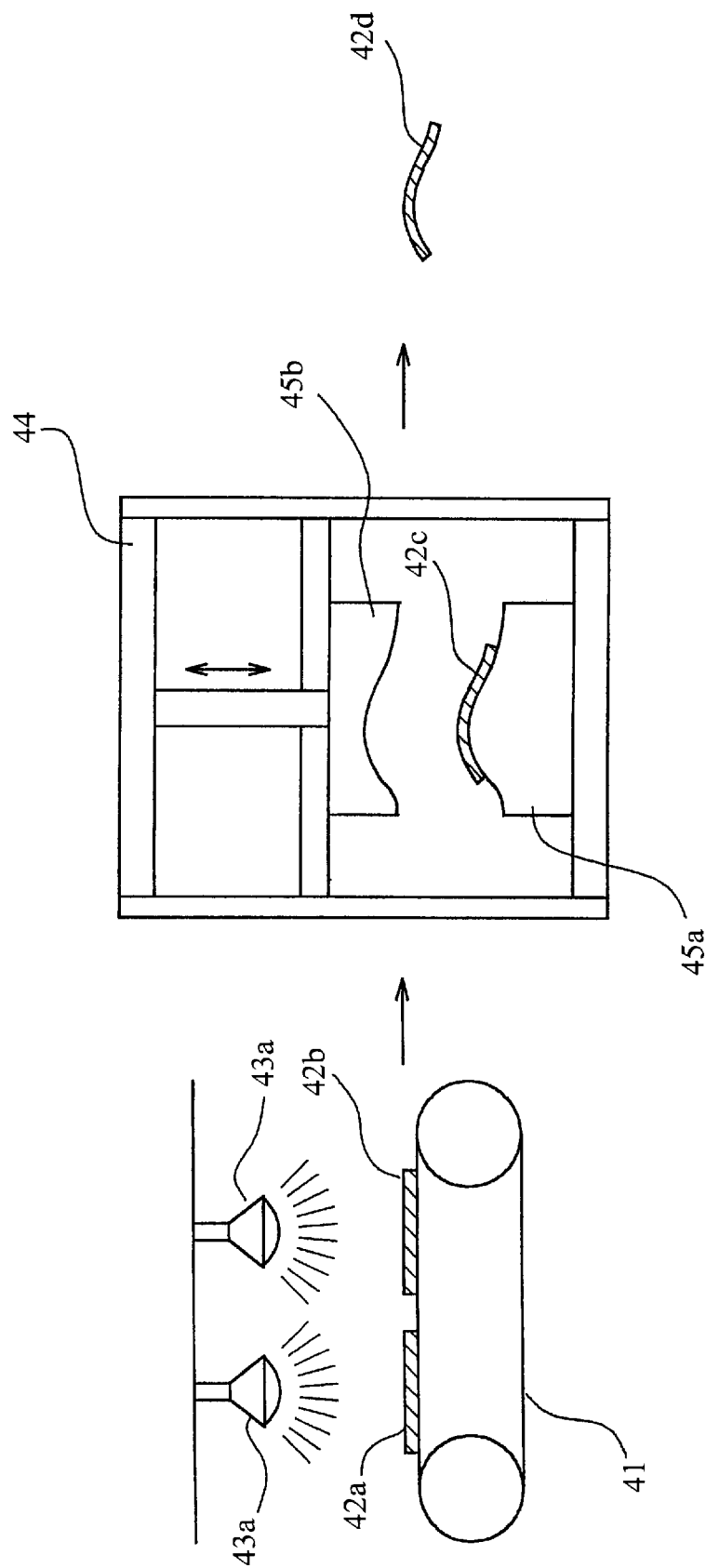
FIG. 7 is a view illustrating an example of a process for producing the three-dimensional moulded products according to an embodiment of the invention.

FIG. 7 illustrates an example of the production of a three-dimedsional moulded product.

Shown on a conveyer 41, are sections 42a and 42b of the multiaxial non-woven fabric of the invention cut to a predetermined size. As they travel they are heated by infrared heaters 43a and 43b. A thus-heated non-woven fabric 42c is placed on a mold 45a of a press 44 and press-formed between the mold 45a and a countermold 45b, to give a three-dimensional moulded product 42d. In this case, it is desirable that the multiaxial non-woven fabric 42 contains low-softening fibers.

When the molds 45a and 45b of the press 44 are each equipped with a heater for heating the laminate, the heating by means of the heaters 43 can be omitted. In some cases, the laminate can be moulded by press treatment alone while omitting the heating.

In the following, typical examples of the invention are described together with a comparative example.

EXAMPLE 1

The equipment shown in FIG. 5 and FIG. 6 was used. The distance between the pin arrays 11a and 11b was 40 mm, the angle of the rail 16 relative to the machine direction was 90 degrees and the second tow-feeding guide 20 was not used. Tows having a total tex of 5,500 (50,000 denier) and composed of filaments having an average fineness of 0.66 tex (6 denier), produced by spinning of pellets recovered from waste PET bottles, followed by stretching and crimping, were used as the raw material. The tows were crosswise overlaid, the warp tows were fed to above and below the layer of cross-overlaid tows at a pitch of 40 mm to thereby sandwich the layer of cross-overlaid tows. The subsequent needle punching and heat treatment at 185° C. gave a triaxially laminated tow-based non-woven fabric (weighing 0.95 kg/in$^2$ and 3.2 mm in thickness).

Table 1 shows experimental results for example 1.

TABLE 1

| | Strength mN/tex | Strength at 50% elongation mN/tex | Extension ratio % | Break energy % mN/tex |
|---|---|---|---|---|
| Warp direction | 46.7 | 30.1 | 72.5 | 3385.8 |
| At angle of 15° | 40.9 | 24.7 | 88.9 | 3636.0 |
| At angle of 30° | 38.7 | 21.8 | 92.1 | 3564.3 |
| At angle of 45° | 37.5 | 24.6 | 91.6 | 3435.0 |
| Weft direction | 40.2 | 28.8 | 95.4 | 3835.1 |

The methods of measuring the above properties are as follows. Samples, 30 cm in length and 10 cm in width, are cut out for each angle. The tenacity of the samples was determined by tensile testing at a test specimen width of 10 cm, a testing length of 10 cm and a pulling rate of 100% per minute. The strength of the samples is calculated by dividing the tenacity value by the fineness (in tex) calculated from the sample weight. The number of test specimens is 5 for each direction.

The above test results for strength at 50% elongation are shown in FIG. 4 by open circle marks.

EXAMPLE 2

The equipment shown in FIG. 5 and FIG. 6 was used. 15 The distance between the pin arrays was 40 mm, the angle of the rail 16 relative to the machine direction was 63.5 degrees and the second tow-feeding guide 20 was also used at an angle of −63.5 degrees between the second rail 21 and the machine direction. Tows having a total tex of 5,500 (50,000 denier) and made of filaments having an average fineness of 0.66 tex (6 denier), produced by spinning of pellets recovered from waste PET bottles, followed by stretching and crimping, were used as the raw material. The tows were crosswise overlaid, the warp tows were fed to above and below the layer of cross-overlaid tows at a pitch of 40 mm to thereby sandwich the layer of cross-overlaid tows. The subsequent needle punching to the same extent as in Example 1 and heat treatment at 150° C. gave a tetraaxially laminated tow-based non-woven fabric weighing 1.05 kg/in$^2$ and having a thickness of about 3.5 mm.

Table 2 shows experimental results of example 2.

TABLE 2

|  | Strength mN/tex | Strength at 50% elongation mN/tex | Extension ratio % | Break energy % mN/tex |
| --- | --- | --- | --- | --- |
| Warp direction | 51.1 | 35.9 | 82.7 | 4226.0 |
| At angle of 15° | 33.5 | 20.8 | 119.8 | 4013.1 |
| At angle of 30° | 29.7 | 12.1 | 111.2 | 3558.0 |
| At angle of 45° | 50.2 | 30.5 | 107.1 | 5376.4 |
| Weft direction | 50.7 | 33.1 | 81.2 | 4116.8 |

The methods of measuring the above properties are the same as mentioned in Example 1.

The above test results for strength at 50% elongation are shown in FIG. 4 by the black circle marks.

COMPARATIVE EXAMPLE

Short fibers having a length of 65 mm were prepared by cutting the same tows as used in Example 1. They were treated on a carding engine to give short fiber webs. These short fiber webs were made into a laminated web by the crosslaying method. Eight laminated webs prepared in that manner were overlaid with one another and subjected to needle punching to the same extent as in Example 1 or 2, to give a short fiber non-woven fabric weighing 1.02 kg/m$^2$ and having a thickness of about 5 mm.

Table 3 shows experimental results for the comparative example.

TABLE 3

|  | Strength mN/tex | Strength at 50% elongation mN/tex | Extension ratio % | Break energy % mN/tex |
| --- | --- | --- | --- | --- |
| Warp direction | 17.7 | 4.2 | 107 | 1893.9 |
| At angle of 15° | 18.9 | 5.1 | 97 | 1833.3 |
| At angle of 30° | 19.9 | 4.6 | 98 | 19502 |
| At angle of 45° | 18.7 | 6.8 | 94 | 1757.8 |
| Weft direction | 32.6 | 9.7 | 91 | 2966.6 |

The methods of measuring the above properties are the same as mentioned in Example 1.

The above test results for strength at 50% elongation are shown in FIG. 4 by the marks X.

As is seen from the results for Examples 1 and 2 and the comparative example, the multiaxial non-woven fabrics have a strength of at least 12 mN/tex and show an elongation of at least 70%, a strength at 50% elongation of 18 mN/tex, and a break energy of at least 3000% mN/tex. In contrast, in the comparative example, the strength is 17 mN/tex, the extension is 91%, the strength at 50% elongation is 4 mN/tex, and the break energy is about 1700% mN/tex. Thus, the strength and break energy were all markedly improved by the present invention. The strength at 50% elongation, in particular, was improved.

In FIG. 4, the triaxial laminate shows a low strength at the angle of 45 degrees and the tetraaxial one shows a low strength at the angle of 30 degrees. In the actual use of such products, however, the width thereof is not so narrow as the sample width of 10 cm and, therefore, values higher than the data values can be obtained. For example, the properties for a sample width of 20 cm at an angle of 30 degrees in example 2 were as follows: the strength was 38 mN/tex, the extension was 135%, strength at 50% elongation was 18 mN/tex, and the break energy was about 5130% mN/tex.

EXAMPLE 3

A short fiber non-woven fabric weighing 100 g/m$^2$ was inserted between the warp members 28 and the cross-overlaid layer and the same fabric was also inserted between the warp members 29 and the cross-overlaid layer (i.e. into the inside of the laminate) in carrying out the procedure of Example 1 using the apparatus shown in FIG. 5. The warp members, oblique members and inserted short fiber non-woven fabric were all subjected to needle punching to give a multiaxial non-woven fabric (non-woven fabric A).

In this example, the short fiber non-woven fabric was prepared by submitting Unitika's bicomponent polyester fibers (Melty 1680, cut length 55 mm, softening point of the low-softening component of the bicomponent fibers 100° C.) to a carding engine.

This multiaxial non-woven fabric A was cut to the size of the mold 45a shown in FIG. 7 and pressed between the molds 45a and 45b. In this case, the molds 45a and 45b were heated to 150° C. The non-woven fabric A was heat-treated by the heat of the heated molds while pressing and, after releasing from the molds and cooling, successfully gave a three-dimensional moulded product.

Although certain preferred embodiments of the present invention have been shown and described in detail, it should be understood that various changes and modifications might be made without departing from the spirit or scope of the appended claims.

The teachings of Japanese Patent Application Number 377350, filed Dec. 28, 1999, are incorporated herein in their entirety, inclusive of the claims, specification and drawings.

What is claimed is:

1. A multiaxially laminated non-woven fabric comprising:
    at least one layer of parallel warp or weft members;
    at least first and second layers of plural parallel oblique tows having a total tex of not less than 1,000 but not more than 30,000, the oblique tows of said first and second layers crossing the warp or weft members and crossing each other with said warp or weft as approximate axes of symmetry; and
    wherein each of said tows is formed as a bundle of crimped filaments having an average fineness of not more than 3 tex.

2. A non-woven fabric according to claim 1, wherein said layers are bonded together by needle punching.

3. A non-woven fabric according to claim 1, wherein said layers are bonded together by stitching.

4. A non-woven fabric according to claim 1, wherein said layers are bonded together by ultrasonic bonding.

5. A non-woven fabric according to claim 1, wherein said layers are bonded together by interlocking filaments produced by means of water jets.

6. A non-woven fabric according to claim 1, wherein said layers are bonded together by interlocking filaments and adhesion produced by blowing air therethrough.

7. A non-woven fabric according to claim 1, having a strength at 50% elongation of not less than 10 mN/tex in all of warp, weft and 45-degree directions.

8. A non-woven fabric according to claim 1, wherein said filaments are conjugate filaments or mixed filaments derived from at least two polymers differing in softening point and wherein the layers are bonded together by thermal embossing or thermal press treatment.

9. A non-woven fabric according to claim 1 wherein said total tex is 2000 to 25,000.

10. A non-woven fabric according to claim 1 wherein said one layer consists of parallel warp.

11. A non-woven fabric according to claim 10 wherein said warp are tows.

12. A non-woven fabric according to claim 11 wherein said warp are tows having a total tex of 30,000–50,000.

13. A non-woven fabric according to claim 12 wherein the warp tows are composed of filaments having an average fineness of not more than 3 tex.

14. A non-woven fabric according to claim 13 wherein said filaments have an average fineness of not more than 1 tex.

15. A non-woven fabric according to claim 1 having an elongation of at least 50% in weft, warp and oblique directions.

16. A three-dimensional product obtained by moulding the non-woven fabric defined in claim 1.

* * * * *

UNITED STATES PATENT AND TRADEMARK OFFICE
CERTIFICATE OF CORRECTION

PATENT NO.    : 6,605,553 B2
DATED         : August 12, 2003
INVENTOR(S)   : Kuroiwa et al.

It is certified that error appears in the above-identified patent and that said Letters Patent is hereby corrected as shown below:

<u>Column 1,</u>
Line 27, "Senish-" should read -- Sen ish --.

<u>Column 4,</u>
Line 24, after "members" begin a new paragraph and insert the following:
      -- The triaxial non-woven fabric" or "triaxially laminated non-woven fabric" means a --.

Signed and Sealed this

Sixteenth Day of March, 2004

JON W. DUDAS
*Acting Director of the United States Patent and Trademark Office*